_United States Patent Office_

2,955,100
Patented Oct. 4, 1960

2,955,100

INCREASING EFFECTIVENESS OF AMINE ANTIOXIDANTS

Rutherford B. Hill, St. Albans, and Harold M. Leeper, Charleston, W. Va., assignors to Monsanto Chemical Company, St. Louis, Mo., a corporation of Delaware No Drawing. Filed July 13, 1955, Ser. No. 521,943

15 Claims. (Cl. 260—45.8)

The present invention relates to improvements in rubber compounding and is particularly directed to the problem of preventing degradation of natural and synthetic rubbers.

The causes of degradation vary and a general object of the invention is to inhibit the various deleterious influences to which rubbers are subjected in service. A particular object of the invention is to prevent exposure of cracking sulfur vulcanizable rubbers. Another object is to prevent the heat embrittlement of butadiene-styrene copolymer rubber. Still another object is to inhibit the aging of sulfur vulcanizable rubbers, whether natural or synthetic. A further object is to provide a combination of anti-degradation agents which exert a synergistic effect. Also, another object is to provide a combination of anti-degradation agents which economically inhibit degradation.

One of the major problems of the rubber industry is the protection of vulcanizates of sulfur vulcanizable rubbers against exposure cracking, that is degradation of the vulcanizates due to ozone while under static or dynamic stress. The problem is a serious one, particularly with respect to the service life of rubber tires, and is aggravated by the fact that in general chemical antioxidants have little or no value in protecting vulcanizates against deterioration by ozone. Waxes which form a protective surface film are useful to inhibit exposure cracking if the rubber is not flexed but protection is lost once the film breaks. When a rubber surface, whether natural or synthetic, comes into contact with an atmosphere containing even a few parts ozone per million a myriad of cracks form on the surface. The cracks continue to grow so that the useful life of the article rapidly terminates. The severity of the problem when rubber articles must be stored for a long time will be readily appreciated.

Deterioration of rubber due to aging is another well defined problem. The degradation is manifested in the case of natural rubber by loss of tensile strength and it is usually attributed to absorption of oxygen. It has long been known that such deterioration can be greatly retarded by treating the rubber before or after vulcanization with substances known as age resistors or antioxidants. The age resisting characteristics of a vulcanized rubber product can be readily ascertained by subjecting samples of the vulcanized rubber to the action of air or oxygen at elevated temperatures.

The compounds known to be useful for inhibiting the degradation of rubber include diaryl amines and the acetone reaction products of mono and diaryl amines. The compounds formed from the primary aromatic amines are now recognized to be dihydroquinolines. The diaryl amine antioxidants include compounds in which one of the aryl groups is further substituted by amino substituents. It has now been discovered that the efficacy of diaryl amine antioxidants, the acetone reaction products of diaryl amines and 1,2-dihydro-2,2,4-trimethylquinolines substituted in the 6-position by an alkyl, aryl or lower alkoxy group is increased by the addition of an aliphatic amine or mixed aliphatic-aromatic monoamine, either as free amine or in the form of a salt. The combination exerts a synergistic effect against aging and improves resistance to exposure cracking.

The aliphatic and mixed amines suitable for practicing the invention include common aliphatic monoamines whether primary, secondary, tertiary or mixtures thereof, and simple mixed aliphatic-aromatic monoamines. The organic substituent on the nitrogen will usually be a hydrocarbon radical but substitution is permissible, notably by cyano, halogen, hydroxy, keto, and lower alkoxy groups. Aliphatic groups include benzyl which is predominantly aliphatic in properties, saturated bivalent radicals attached to a central nitrogen atom to complete a saturated heterocyclic ring and alicyclic as well as saturated and unsaturated open carbon chain radicals. Addition of the amine in the form of a salt is usually preferred and has the advantage of lowering volatility.

Salts of dicyclohexylamine have been studied extensively and found to be generally effective. Fatty acid salts are fully equivalent to the free amine if added to provide an equivalent amine content. The preferred salts are the stearate, acetate, oleate, adipate, oxalate, formate, nitrite, toluene sulfonate and dodecylbenzene sulfonate. Less desirable are the benzoate, salicylate and phthalate. Many other aliphatic amines inhibit exposure cracking, esecially of natural rubber. Examples of aliphatic amines which have been tested and found suitable for use in practicing the invention comprise: cyclohexylamine stearate, N-methylcyclohexylamine, N-methylcyclohexylamine acetate, N-methylcyclohexylamine stearate, N-2-cyanoethylcyclohexylamine, N-2-chloroallylcyclohexylamine, N - (3-chloro-2-butenyl)cyclohexylamine, N-nonenylcyclohexylamine, N - dodecenylcyclohexylamine, N-dodecylcyclohexylamine, N-methyldicyclohexylamine, N-methyldicyclohexylamine formate, N-methyldicyclohexylamine stearate, 2-dicyclohexylaminoethanol, dicyclohexylamino-2-propanone, N-butyldicyclohexylamine, N,N-dimethylcyclohexylamine, N,N-dimethylcyclohexylamine stearate, dibutylamine, dibutylamine oleate, diamylamine, dioctylamine, diethanolamine, morpholine, morpholine stearate, and N-2-cyanoethylbutylamine.

The mixed aliphatic-aromatic amines contemplated contain in addition to an aliphatic substituent which is preferably one or more cyclohexyl groups, one monovalent aromatic substituent attached to nitrogen. By monovalent is meant that the aromatic group is linked to the residue of the molecule containing the amino substituent by a single valence and is linked to only one amino substituent. Examples of mixed amines which have been tested and found suitable for practicing the invention comprise: N-cyclohexylaniline, N-cyclohexyl-p-phenetidine, N-cyclohexyl-o-hydroxyaniline, N-2-cyanoethylaniline, N-2-cyanoethyl-p-toluidine, N-2-cyanoethyl-p-amylaniline, N-ethyl-p-phenetidine, N-benzyl-p-phenetidine, N-2-cyanoethyl-p-phenetidine, N-2-cyanoethyl-o-phenetidine, N-allyl-p-phenetidine, N,N-diethyl-p-phenetidine and N,N-dimethylaniline stearate.

The aromatic amine antioxidants suitable for practicing the invention have been disclosed in the chemical and patent literature. Examples include diphenylamine, phenyl-β-naphthylamine, reaction product of diphenylamine and acetone, p,p'-dimethoxy diphenylamine, diphenyl-p-phenylenediamine, N-phenyl - N'-cyclohexyl-p-phenylenediamine, 1,2 - dihydro-6-phenyl-2,2,4-trimethylquinoline, 1,2-dihydro - 6 - methoxy-2,2,4-trimethylquinoline, 1,2-dihydro-6-ethoxy-2,2,4-trimethylquinoline, 1,2-dihydro-6-butyl-2,2,4-trimethylquinoline, 1,2 - dihydro-6-amyl-2,2,4-trimethylquinoline, 1,2-dihydro-6-octyl-2,2,4- trimethylquinoline, 1,2 - dihydro-6-decyl-2,2,4-trimethylquinoline and 1,2-dihydro-6-dodecyl-2,2,4-trimethylquinoline.

Specific embodiments of the invention which illustrate the anti-exposure cracking properties of the combinations were prepared from the following base formulation:

| | Parts by weight |
|---|---|
| Pale crepe rubber | 100.0 |
| Zinc oxide | 25.0 |
| Titanium dioxide | 50.0 |
| Clay | 15.0 |
| Sulfur | 3.0 |
| Stearic acid | 1.0 |
| Benzothiazolyl disulfide | 0.6 |
| Diphenyl guanidine | 0.15 |

In addition to the base formula the final stocks contained the following:

| Stock | 1 | 2 | 3 | 4 |
|---|---|---|---|---|
| | Parts by weight | | | |
| 1,2 - Dihydro - 6 - ethoxy - 2,2,3 - trimethylquinoline | 2.0 | | 1.75 | 1.5 |
| Dicyclohexylamine | | 2.0 | 0.25 | 0.5 |

The increased resistance to exposure cracking was demonstrated by vulcanizing the stocks in the usual manner by heating in a press and determining the resistance of the vulcanizates to cracking by ozone. For the reasons already explained, evaluation under static conditions is not indicative of the service life of rubber articles which must withstand flexing so the vulcanized compositions were evaluated under dynamic conditions in an atmosphere containing a definite concentration of ozone. Samples of the stocks were cured in the form of a belt ½" wide, ¼" thick and 5⅝₁₆" inside diameter and mounted on 1" diameter shafts. The ozone concentration was maintained at 20–30 parts per hundred million throughout the test and the shafts were rotated at 75 r.p.m. In this manner a momentary elongation through a range of 0–20% was provided at any portion of the test specimen passing over the shaft. (The apparatus and procedure employed are described in Analytical Chemistry, vol 25, page 241, February 1953.) The experimental test specimens were compared visually at various intervals noting the extent of cracking. A stock which is severely cracked has no service life remaining in terms of the useful life of a rubber article and where the cracking is designated as extremely severe the degradation is well beyond even this point. The results of the tests are set forth below:

Table I

| Stock | Surface Cracking after Flexing in Ozone for— | | | |
|---|---|---|---|---|
| | 80 Hours | 104 Hours | 120 Hours | 168 Hours |
| 1 | none | none | none | v. slight. |
| 2 | v. slight | slight | moderate | severe. |
| 3 | none | none | none | none. |
| 4 | do | do | do | Do. |

The dihydroquinoline antioxidant used in these tests is a very effective inhibitor of exposure cracking. Yet the replacement of part of it by dicyclohexylamine, a much weaker inhibitor, enhanced the protection. For best results the dihydroquinoline should be used in major proportion. Moreover, after aging the stocks containing the combination are still superior. This effect was demonstrated by preparation of test stocks from the following synthetic rubber base formula:

| | Parts by weight |
|---|---|
| Butadiene-styrene copolymer rubber [1] | 100.0 |
| Carbon black | 50.0 |
| Zinc oxide | 4.0 |
| Stearic acid | 2.0 |
| Saturated hydrocarbon softener | 10.0 |
| Sulfur | 1.75 |
| Cyclohexyl 2-benzothiazolesulfenamide | 1.2 |

[1] GR–S 1500.

In addition to the base formula the final stocks contained the following:

| Stock | 5 | 6 | 7 | 8 |
|---|---|---|---|---|
| | Parts by weight | | | |
| 1,2 - Dihydro-6-ethoxy -2,2,4 -trimethylquinoline | 1.5 | 1.5 | 1.5 | 1.5 |
| Dicyclohexylamine stearate | | 0.1 | 0.3 | 0.5 |

The compositions were vulcanized by heating in a press for 60 minutes at 144° C., then artificially aged by heating in a circulating air oven 48 hours at 100° C. Resistance to cracking by ozone was then determined in the manner described and test results recorded. The table below shows the clear superiority of the stocks containing dicyclohexylamine after the longer periods of exposure.

Table II

| Stock | Surface Cracking After Flexing in Ozone for— | | | |
|---|---|---|---|---|
| | 24 Hours | 48 Hours | 72 Hours | 84 Hours |
| 5 | none | slight | moderate | severe. |
| 6 | do | do | slight | moderate. |
| 7 | do | v. slight | do | Do. |
| 8 | do | do | do | Do. |

Further specific embodiments of the invention were prepared by adding to the synthetic rubber base stock the following:

| Stock | 9 | 10 | 11 | 12 | 13 |
|---|---|---|---|---|---|
| | Parts by weight | | | | |
| 1,2-Dihydro-6-dodecyl-2,2,4-trimethylquinoline | 1.5 | | 1.2 | 0.75 | 0.5 |
| Dicyclohexylamine stearate | | 1.5 | 0.3 | 0.75 | 1.0 |

The stocks so compounded were vulcanized and the resistance of the vulcanizates to exposure cracking evaluated all in the manner described. Note that the stocks in which either a minor or a major proportion of the dihydroquinoline was replaced by dicyclohexylamine were superior to those containing either ingredient alone.

Table III

| Stock | Surface Cracking After Flexing in Ozone for— | | |
|---|---|---|---|
| | 24 Hours | 36 Hours | 48 Hours |
| 9 | v. slight | moderate | moderate. |
| 10 | none | slight | Do. |
| 11 | do | do | slight. |
| 12 | do | do | Do. |
| 13 | do | do | Do. |

The combination of aliphatic and aromatic amine exerts a synergistic effect on aging. These properties are illustrated by further embodiments of the invention wherein stocks were compounded from a natural rubber base comprising:

| | Parts by weight |
|---|---|
| Smoked sheets | 100.0 |
| Carbon black | 50.0 |
| Zinc oxide | 5.0 |
| Stearic acid | 3.0 |
| Saturated hydrocarbon softener | 3.0 |
| Sulfur | 2.5 |
| Cyclohexyl 2-benzothiazolesulfenamide | 0.5 |

The stocks compounded from this base were vulcanized by heating in a press and the optimum cures artificially aged by heating in a circulating air oven at 100° C. The tensile strength after aging was determined as well as the tensile strength of the unaged stocks and the percentage retained after aging calculated. In some cases additional tests were conducted by measuring the time at 100° C. within which the vulcanizates relaxed under constant load. In this test, known as the continuous creep test, the time required for the sample to double in length was recorded. For description of the apparatus and procedure see M. C. Throdahl, "Aging of Elastomers. Comparison of Creep with Some Conventional Aging Methods," Industrial & Engineering Chemistry, vol. 40, p. 2180, November 1948. The materials added to the base stock and the corresponding physical properties of the vulcanizates are summarized in the tables below:

*Table IV*

| Stock | 14 | 15 | 16 |
|---|---|---|---|
| | Parts by weight | | |
| 1,2-Dihydro-6-ethoxy-2,2,4-trimethyl-quinoline | 1.5 | 1.5 | 1.5 |
| Dicyclohexylamine stearate | | 0.3 | 0.5 |
| Percent Tensile Strength Retained After Aging 48 hrs | 45 | 49 | 50 |

*Table V*

| Stock | 17 | 18 | 19 | 20 | 21 |
|---|---|---|---|---|---|
| | Parts by weight | | | | |
| 1,2-Dihydro-6-dodecyl-2,2,4-trimethyl-quinoline | 1.5 | | 1.2 | 0.75 | 0.5 |
| Dicyclohexylamine stearate | | 1.5 | 0.3 | 0.75 | 1.0 |
| Percent Tensile Strength Retained After Aging 48 hrs | 64 | 47 | 79 | 77 | 74 |
| Creep, hrs | 59 | 52 | 65 | 74 | 66 |

*Table VI*

| Stock | 22 | 23 | 24 | 25 | 26 | 27 |
|---|---|---|---|---|---|---|
| | Parts by weight | | | | | |
| 1,2-Dihydro-6-phenyl-2,2,4-trimethylquinoline | 1.0 | | 0.8 | 0.6 | 0.4 | 0.2 |
| Dicyclohexylamine acetate | | 1.0 | 0.2 | 0.4 | 0.6 | 0.8 |
| Percent Tensile Strength Retained After Aging 48 hrs | 42 | 35 | 58 | 75 | 58 | 61 |
| Creep, hrs | 47 | 40 | 53 | 53 | 52 | 48 |

*Table VII*

| Stock | 28 | 29 | 30 | 31 | 32 | 33 |
|---|---|---|---|---|---|---|
| | Parts by weight | | | | | |
| Phenyl-β-naphthylamine | 1.0 | | 0.8 | 0.6 | 0.4 | 0.2 |
| Dicyclohexylamine acetate | | 1.0 | 0.2 | 0.4 | 0.6 | 0.8 |
| Percent Tensile Strength Retained After Aging 48 hrs | 24 | 28 | 39 | 37 | 32 | 29 |

*Table VIII*

| Stock | 34 | 35 | 36 | 37 | 38 | 39 |
|---|---|---|---|---|---|---|
| | Parts by weight | | | | | |
| Reaction product of diphenylamine and acetone | 1.0 | | 0.8 | 0.6 | 0.4 | 0.2 |
| Dicyclohexylamine acetate | | 1.0 | 0.2 | 0.4 | 0.6 | 0.8 |
| Percent Tensile Strength Retained After Aging 48 hrs | 48 | 35 | 59 | 57 | 70 | 66 |

*Table IX*

| Stock | 40 | 41 | 42 | 43 | 44 |
|---|---|---|---|---|---|
| | Parts by weight | | | | |
| Heptylated diphenylamine | 1.0 | | 0.8 | 0.6 | 0.4 |
| Dicyclohexylamine acetate | | 1.0 | 0.2 | 0.4 | 0.6 |
| Percent Tensile Strength Retained After Aging 48 hrs | 56 | 37 | 59 | 57 | 62 |
| Creep, hrs | 45 | 34 | 46 | 48 | 52 |

*Table X*

| Stock | 45 | 46 | 47 | 48 | 49 | 50 |
|---|---|---|---|---|---|---|
| | Parts by weight | | | | | |
| N-Cyclohexyl-N'-phenyl-p-phenylenediamine | 1.0 | | 0.8 | 0.6 | 0.4 | 0.2 |
| Dicyclohexylamine acetate | | 1.0 | 0.2 | 0.4 | 0.6 | 0.8 |
| Percent Tensile Strength Retained After Aging 72 hrs | 29 | 21 | 30 | 40 | 37 | 49 |

It will be appreciated that the aliphatic and aromatic amine may be admixed before addition to the rubber. The amounts will vary depending upon the particular rubber composition and the results desired. Usually the aromatic amine antioxidant should be used in major proportion with at least 10% by weight of aliphatic amine. The total amount of the mixture added to the rubber can also vary. The rubber may be treated with the antidegradation agents by Banbury mixing or milling, by addition to rubber latex or by application to the surface of crude or vulcanized rubber.

While the invention has been illustrated by compositions in which elemental sulfur was the vulcanizing agent, other vulcanizing systems are applicable, as for example N,N'-dithioamines. N,N'-dithiobis morpholine is a satisfactory vulcanizing agent. Any sulfur vulcanizing agent is suitable whether in the form of elemental sulfur or selenium or a sulfur compound which releases sulfur at vulcanizing temperature. The sulfur level can be varied to achieve particular advantages. For example even better aging stocks result from reducing the sulfur. About 1.4 parts is optimum for GR-S and about 1.0% is optimum for natural rubber. Similarly, other sulfur vulcanizable rubbers may be used in the practice of the invention. These include homopolymers and copolymers of diene hydrocarbons. A variety of sulfur vulcanizable diene hydrocarbon rubbers are known, several of which have achieved commercial importance and may be used to advantage in practice of the invention.

It is intended to cover all changes and modifications of the examples of the invention herein chosen for purposes of disclosure which do not constitute departures from the spirit and scope of the invention.

What is claimed is:

1. A sulfur vulcanizable diene hydrocarbon rubber composition having incorporated therein a small amount sufficient to inhibit degradation of the rubber of a synergistic antidegradant composed of a rubber antioxidant selected from the class consisting of heptylated diphenylamine, diphenylamine, phenyl-β-naphthylamine, reaction product of diphenylamine and acetone, p,p'-dimethoxy diphenylamine, diphenyl-p-phenylenediamine, N-phenyl-N'- cyclohexyl-p-phenylenediamine, 1,2-dihydro-6-phenyl-2,2,4 - trimethylquinoline, 1,2 - dihydro-6-methoxy-2,2,4-trimethylquinoline, 1,2 - dihydro-6-ethoxy-2,2,4-trimethylquinoline, 1,2-dihydro-6-butyl-2,2,4-trimethylquinoline, 1,2-dihydro-6-amyl-2,2,4-trimethylquinoline, 1,2-dihydro-6-octyl - 2,2,4-trimethylquinoline, 1,2-dihydro-6-decyl-2,2,4-trimethylquinoline, and 1,2 - dihydro-6-dodecyl-2,2,4-trimethylquinoline and a substituted ammonia compound selected from the class consisting of dicyclohexylamine and acid addition salts thereof, the proportion of the rubber antioxidant being within the range of about 20–94% and the proportion of the substituted ammonia compound being within the range of about 80–6% of the combined weight.

2. A sulfur vulcanizable diene hydrocarbon rubber composition having incorporated therein a small amount sufficient to inhibit degradation of the rubber of a synergistic antidegradant composed of a rubber antioxidant selected from the class consisting of heptylated diphenylamine, diphenylamine, phenyl-β-naphthylamine, reaction product of diphenylamine and acetone, p,p'-dimethoxy diphenylamine, diphenyl-p-phenylenediamine, N-phenyl-N'-cyclohexyl-p-phenylenediamine, 1,2-dihydro-6-phenyl-2,2,4 - trimethylquinoline, 1,2 - dihydro-6-methoxy-2,2,4-trimethylquinoline, 1,2 - dihydro-6-ethoxy-2,2,4-trimethylquinoline, 1,2 - dihydro-6-butyl-2,2,4-trimethylquinoline, 1,2-dihydro-6-amyl-2,2,4-trimethylquinoline, 1,2-dihydro-6-octyl-2,2,4-trimethylquinoline, 1,2-dihydro-6-decyl-2,2,4-trimethylquinoline, and 1,2 - dihydro-6-dodecyl-2,2,4-trimethylquinoline and dicyclohexylamine acid addition salt, the proportion of the rubber antioxidant being within the range of about 20–94% and the proportion of the dicyclohexylamine acid addition salt being within the range of about 80–6% of the combined weight.

3. A sulfur vulcanizable diene hydrocarbon rubber composition having incorporated therein a small amount sufficient to inhibit degradation of the rubber of a synergistic antidegradant composed of a rubber antioxidant selected from the class consisting of heptylated diphenylamine, diphenylamine, phenyl-β-naphthylamine, reaction product of diphenylamine and acetone, p,p'-dimethoxy diphenylamine, diphenyl-p-phenylenediamine, N-phenyl-N'-cyclohexyl-p-phenylenediamine, 1,2-dihydro-6-phenyl-2,2,4-trimethylquinoline, 1,2-dihydro - 6 - methoxy-2,2,4-trimethylquinoline, 1,2-dihydro-6-ethoxy-2,2,4-trimethylquinoline, 1,2 - dihydro-6-butyl-2,2,4-trimethylquinoline, 1,2 - dihydro-6-amyl-2,2,4-trimethylquinoline, 1,2-dihydro-6-octyl-2,2,4-trimethylquinoline, 1,2-dihydro-6-decyl-2,2,4-trimethylquinoline, and 1,2-dihydro-6-dodecyl-2,2,4-trimethylquinoline and dicyclohexylamine acetate, the proportion of the rubber antioxidant being within the range of about 20–94% and the proportion of the dicyclohexylamine acetate being within the range of about 80–6% of the combined weight.

4. A sulfur vulcanizable diene hydrocarbon rubber composition having incorporated therein a small amount sufficient to inhibit degradation of the rubber of a synergistic antidegradant composed of a rubber antioxidant selected from the class consisting of heptylated diphenylamine, diphenylamine, phenyl-β-naphthylamine, reaction product of diphenylamine and acetone, p,p'-dimethoxy diphenylamine, diphenyl-p-phenylenediamine, N-phenyl-N'-cyclohexyl-p-phenylenediamine, 1,2-dihydro-6-phenyl-2,2,4-trimethylquinoline, 1,2 - dihydro-6-methoxy-2,2,4-trimethylquinoline, 1,2-dihydro-6-ethoxy-2,2,4-trimethylquinoline, 1,2 - dihydro-6-butyl-2,2,4-trimethylquinoline, 1,2-dihydro-6-amyl-2,2,4-trimethylquinoline, 1,2-dihydro-6-octyl-2,2,4-trimethylquinoline, 1,2-dihydro-6-decyl-2,2,4-trimethylquinoline, and 1,2-dihydro-6-dodecyl-2,2,4-trimethylquinoline and dicyclohexylamine stearate, the proportion of the rubber antioxidant being within the range of about 20–94% and the proportion of dicyclohexylamine stearate being within the range of about 80–6% of the combined weight.

5. The composition of claim 1 in which the substituted ammonia compound is dicyclohexylamine.

6. The composition of claim 1 in which the substituted ammonia compound is a fatty acid addition salt of dicyclohexylamine, the proportion of the rubber antioxidant being within the range of about 20–90% and the proportion of fatty acid addition salt of dicyclohexylamine being within the range of about 80–10% of the combined weight the proportion of combined stabilizer being within the range of 1–2% of the rubber hydrocarbon.

7. A sulfur vulcanizable diene hydrocarbon rubber composition having incorporated therein a small amount sufficient to inhibit degradation within the range of 1–2% of the rubber hydrocarbon of a synergistic antidegradant composed of about 20–90% of 1,2-dihydro-6-ethoxy-2,2,4-trimethylquinoline and about 80–10% of a fatty acid addition salt of dicyclohexylamine.

8. A sulfur vulcanizable diene hydrocarbon rubber composition having incorporated therein a small amount sufficient to inhibit degradation within the range of 1–2% of the rubber hydrocarbon of a synergistic antidegradant composed of about 20–90% of 1,2-dihydro-6-dodecyl-2,2,4-trimethylquinoline and about 80–10% of a fatty acid addition salt of dicyclohexylamine.

9. Vulcanized diene hydrocarbon rubber having incorporated therein a small amount sufficient to inhibit degradation of the rubber of a synergistic antidegradant composed of a rubber antioxidant selected from the class consisting of heptylated diphenylamine, diphenylamine, phenyl-β-naphthylamine, reaction product of diphenylamine and acetone, p,p'-dimethoxy diphenylamine, diphenyl-p-phenylenediamine, N - phenyl-N'-cyclohexyl-p-phenylenediamine, 1,2-dihydro-6-phenyl-2,2,4-trimethylquinoline, 1,2 - dihydro-6-methoxy-2,2,4-trimethylquinoline, 1,2-dihydro-6-ethoxy-2,2,4-trimethylquinoline, 1,2-dihydro-6-butyl-2,2,4-trimethylquinoline, 1,2-dihydro-6-amyl-2,2,4-trimethylquinoline, 1,2-dihydro-6-octyl-2,2,4-trimethylquinoline, 1,2 - dihydro-6-decyl-2,2,4-trimethylquinoline and 1,2-dihydro-6-dodecyl-2,2,4-trimethylquinoline and a substituted ammonia compound selected from the class consisting of dicyclohexylamine and acid addition salts thereof, the proportion of the rubber antioxidant being within the range of about 20–94% and the proportion of the substituted ammonia compound being within the range of about 80–6% of the combined weight.

10. The composition of claim 9 in which the substituted ammonia compound is dicyclohexylamine acetate.

11. The composition of claim 9 in which the substituted ammonia compound is dicyclohexylamine stearate.

12. The composition of claim 9 in which the substituted ammonia compound is dicyclohexylamine.

13. The composition of claim 9 in which the substituted ammonia compound is a fatty acid addition salt of dicyclohexylamine, the proportion of the rubber antioxidant being within the range of about 20–90% and the proportion of fatty acid addition salt of dicyclohexylamine being within the range of about 80–10% of the combined weight the proportion of combined stabilizer being within the range of 1–2% of the rubber hydrocarbon.

14. Vulcanized diene hydrocarbon rubber having incorporated therein a small amount sufficient to inhibit degradation within the range of 1–2% of the rubber hydrocarbon of a synergistic antidegradant composed of about 20–90% of 1,2-dihydro-6-ethoxy-2,2,4-trimethylquinoline and about 80–10% of a fatty acid addition salt of dicyclohexylamine.

15. Vulcanized diene hydrocarbon rubber having incorporated therein a small amount sufficient to inhibit degradation within the range of 1–2% of the rubber hydrocarbon of a synergistic antidegradant composed of about 20–90% of 1,2-dihydro-6-dodecyl-2,2,4-trimethylquinoline and about 80–10% of a fatty acid addition salt of dicyclohexylamine.

References Cited in the file of this patent

UNITED STATES PATENTS

| | | |
|---|---|---|
| 2,643,981 | Kelly | June 30, 1953 |
| 2,654,679 | Goppel et al. | Oct. 3, 1953 |
| 2,729,690 | Oldenburg | Jan. 3, 1956 |
| 2,729,691 | De Pree | Jan. 3, 1956 |
| 2,748,100 | Harris | May 29, 1956 |

FOREIGN PATENTS

| | | |
|---|---|---|
| 487,980 | Great Britain | June 29, 1938 |
| 712,447 | Great Britain | July 21, 1954 |